Oct. 8, 1940.  H. K. FOSTER  2,217,474

CONTROL FOR ELECTRICALLY HEATED APPLIANCES

Filed May 10, 1939

INVENTOR
Hoyt K. Foster
BY
*Pennie Davis Marvin & Edmonds*
ATTORNEYS

Patented Oct. 8, 1940

2,217,474

UNITED STATES PATENT OFFICE 2,217,474

CONTROL FOR ELECTRICALLY HEATED APPLIANCES

Hoyt K. Foster, Hollis, N. Y., assignor to S. W. Farber, Inc., Brooklyn, N. Y., a corporation of New York Application May 10, 1939, Serial No. 272,752

9 Claims. (Cl. 219—43)

This invention relates to a device for controlling electrically heated appliances, and particularly those which are adapted to the preparation of beverages, although the principles involved may be utilized in various culinary and other equipment. The invention will be described more particularly in connection with a coffee maker, without, however, limiting the subject matter to this specific application.

Coffee makers including an electrical heating element to effect the heating of the water are well known, and various attempts have been made heretofore to utilize theromostatic means in connection with the heating element in order that the supply of current may be cut off automatically when the brewing operation is completed, and also to restore the current for brief periods to maintain the temperature of the brew. Such devices have not been entirely satisfactory, because the thermostats have been subject to unpredictable conditions such as the temperature of the surrounding atmosphere, drafts and variable heat transfer from the mechanism itself, and the devices are, therefore, not completely reliable and often do not accomplish their intended purpose.

It is the object of the present invention to provide a device in which the thermostatic element is not subject to unpredictable conditions and is caused to operate by a regulated flow of heat from the vessel in connection with which it is used, with a definite and predetermined heat lag due to the imposition of heat insulating means of predetermined value, so that the operation of the device can be predicted with certainty and when adjusted will operate precisely in the manner intended to control the operation of the heating element and therefore of the apparatus.

Figure 1:
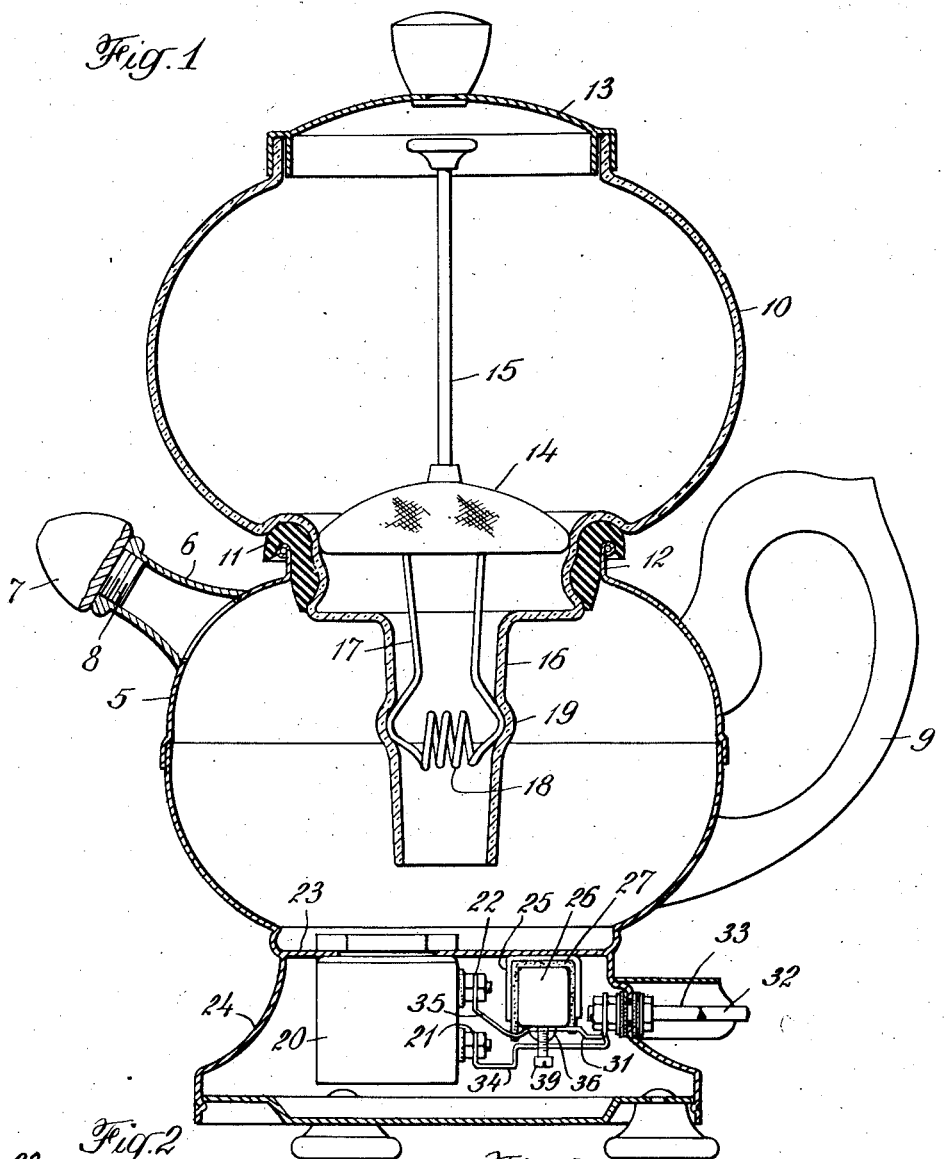
Figure 2:
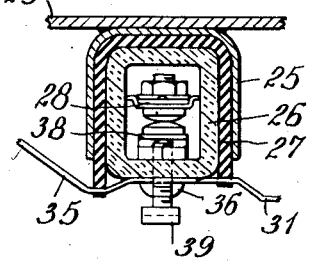
Figure 3:
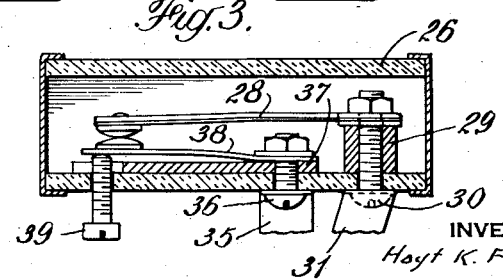

Other objects and advantages of the invention will be apparent as it is better understood by reference to the following specification and the accompanying drawing, in which Fig. 1 is a vertical section illustrating the application of the invention to a coffee maker;

Fig. 2 is an enlarged transverse section illustrating the arrangement of the thermostat in reference to the coffee maker, and Fig. 3 is a longitudinal section through the thermostat.

Referring to Fig. 1 of the drawing, 5 indicates a receptacle of a coffee maker which is adapted to receive a supply of water. It is provided with a pouring spout 6 having a cap 7 provided with threads 8 adapted to engage the mouth of the spout, so that the latter may be sealed during the brewing operation. A handle 9 is provided to facilitate manipulation of the device.

A container 10 of glass or other suitable material is mounted above the receptacle 5 and is provided with a gasket 11 of rubber or other suitable resilient material to afford a seal with the flange 12 of the receptacle 5. A removable cover 13 is provided to close the opening at the top of the container 10. A filter element 14 is supported on a rod 15 and is adapted to cover the opening of a depending funnel 16 which extends into the receptacle 5. An extension 17 of the rod 15 is provided with resilient means 18 engaging the bulging wall 19 of the funnel 16 to hold the filter in place.

In the operation of the device, the required amount of water is placed in the receptacle 5 and the coffee is placed on the filter element 14. Heat is applied until the water boils, thereby developing pressure within the receptacle 5 and thus causing the water to rise through the funnel 16 into the container 10. When the brew is completed, the heat is withdrawn, whereupon the coffee descends into the receptacle 5. This operation is well understood in the art, and the structure hereinbefore set forth forms no part of the present invention.

In carrying out the invention, I provide an enclosed heating element 20 consisting of a suitable resistance (not shown) within a sealed housing through which terminals 21 and 22 project to afford electrical connections. The heating element 20 is mounted on the bottom 23 of the receptacle 5 and projects into the base 24 thereof. Other suitable heating elements can be used.

Also supported on the bottom 23 by soldering or otherwise and in full heat transfer relation therewith, I provide a metal clip 25, within which the thermostat which effects the control of the current for the heating element is disposed, within a housing 26 which is preferably made of a heat insulating ceramic material, although any suitable heat resisting plastic may be employed. Surrounding three sides of the housing 26 is a layer of heat insulating material 27, for example asbestos. The co-efficients of heat transfer of the materials used for heat insulation are known, and the necessary thickness thereof can be determined readily to afford a definite heat lag between the bottom of the receptacle 5 and the thermostatic element within the housing 26.

For the thermostatic element I prefer a bimetal element 28 which is mounted on a post 29 and is provided with an external connection 30 which may be connected by a strap or other conductor 31 to one of the terminals 32 through which current is supplied. The other terminal 33 is connected by a strap or other conductor 34 to the terminal 21 of the heating element. A strap or other conductor 35 connects the terminal 22 of the heating element to a terminal 36 on a post 37 which carries a conducting arm 38 within the housing 26. The latter is adjustable by means of a screw 39 to vary the distance from the bi-metal element 28.

In the arrangement as described, when current is supplied, the circuit is normally closed through the bi-metal element 28 and the conducting arm 38 to the heating element, and thence through the conductor 34. Heat is supplied by the heating element to boil the water in the receptacle 5. The generation of steam results in forcing the water into the container 10 where the coffee is brewed. The bi-metal element 28 is set to open the circuit when its temperature reaches a certain point, for example 180–190° F. The latter temperatures are merely illustrative, and other temperatures may be selected. The temperature of the bi-metal element is raised by transfer of heat through the bottom 23 of the receptacle 5, the metal clip 25, the insulation 27 and the housing 26. Since as already indicated the insulation is designed to afford a definite heat lag or resistance to the transfer of heat, the thermostat will operate at the intended time to shut off the supply of current. At this time, the coffee has been brewed and as the steam in the receptacle 5 is condensed, the coffee returns to the receptacle 5. Its temperature will drop slowly through loss of heat to the surrounding atmosphere, and meanwhile the temperature of the thermostat will also fall until the contact is again made and current is supplied to reheat the coffee in the receptacle 5. The contact will, however, be only for a relatively brief period, when the temperature of the thermostat will again rise to break the circuit. This operation will go on indefinitely, as long as the device is connected to the source of current, without, however, raising the temperature of the coffee in the receptacle 5 to the boiling point.

The bi-metal element 28 is preferably connected, as indicated, to the terminal 32 in order to avoid transfer of heat through the connection from the heating element. It may, however, be connected to the heating element if a connection of low conductivity is used, such as a perforated strip or an elongated wire. While I prefer the bi-metal thermostat as described, other types of thermostats may be utilized, provided they are employed in connection with the heat conducting clip and the insulation of known value to effect the operation in the manner hereinbefore described.

I have described my invention in connection with a coffee maker, but it may be utilized with percolators, devices for brewing tea and other beverages, and in general in connection with culinary and other apparatus where it is desirable to automatically cut off the flow of current to the heating element after a predetermined brewing or cooking period and to restore the current at intervals in order to maintain a desired lower temperature than was used for brewing or cooking.

The device as described minimizes or entirely eliminates the unpredictable factors which affect the operation of thermostats when exposed to the atmosphere or connected in such a manner that the flow of heat from the source thereof to the thermostat is not under predictable control. In the device as described, the operation of the thermostat results only from flow of heat directly from the bottom of the receptacle 5 through the clip 25 and the surrounding insulation. When the value of the insulation has been determined, the resulting operation is precise and is unaffected by extraneous conditions. The operation may be adjusted only by varying the distance between the bi-metal element 28 and the arm 38 by means of the screw 39.

Various changes may be made in the details of structure and arrangement of the parts without departing from the invention or sacrificing the advantages thereof.

I claim:

1. A device for thermal control which comprises a receptacle, an electric heating element associated therewith, circuit terminals, a heat conducting support secured to the receptacle to transmit heat by conduction therefrom, a thermostat in the support, electrical connections between the heating element, thermostat and terminals, and heat insulating material of predetermined value between the support and the thermostat whereby a desired lag is established in the transmission of heat from the receptacle to the thermostat.

2. A device for thermal control which comprises a receptacle, an electric heating element associated therewith, circuit terminals, a heat conducting support secured to the receptacle to transmit heat by conduction therefrom, a thermostat in the support, electrical connections between the heating element, thermostat and terminals, and heat insulating material of predetermined value between the support and the thermostat including a heat insulating housing enclosing the thermostat, whereby a desired lag is established in the transmission of heat from the receptacle to the thermostat.

3. A device for thermal control which comprises a receptacle, an electric heating element associated therewith, circuit terminals, a heat conducting support secured to the receptacle to transmit heat by condution therefrom, a thermostat in the support, electrical connections between the heating element, thermostat and terminals, and heat insulating material of predetermined value between the support and the thermostat including a heat insulating housing enclosing the thermostat and additional heat insulating material between the support and the housing, whereby a desired lag is established in the transmission of heat from the receptacle to the thermostat.

4. A device for thermal control which comprises a receptacle, an electric heating element associated therewith, circuit terminals, a heat conducting support secured to the receptacle to transmit heat by conduction therefrom, a bi-metal thermostat in the support, electrical connections between the heating element, thermostat and terminals, and heat insulating material of predetermined value between the support and the thermostat whereby a desired lag is established in the transmission of heat from the receptacle to the thermostat.

5. A device for thermal control which comprises a receptacle, an electric heating element associated therewith, circuit terminals, a heat conducting support secured to the receptacle to transmit heat by conduction therefrom, a bi-metal thermostat in the support, electrical connections between the heating element, thermostat and terminals, and heat insulating material of predetermined value between the support and the thermostat including a heat insulating housing enclosing the thermostat, whereby a desired lag is established in the transmission of heat from the receptacle to the thermostat.

6. A device for thermal control which comprises a receptacle, an electric heating element associated therewith, circuit terminals, a heat conducting support secured to the receptacle to transmit heat by conduction therefrom, a bi-metal thermostat in the support, electrical connections between the heating element, thermostat and terminals, and heat insulating material of predetermined value between the support and the thermostat including a heat insulating housing enclosing the thermostat and additional heat insulating material between the support and the housing, whereby a desired lag is established in the transmission of heat from the receptacle to the thermostat.

7. A device for thermal control which comprises a receptacle, an electric heating element associated therewith, circuit terminals, a support of invariable heat-conductivity to transmit heat by conduction, a stationary thermostatic unit secured to the support, electrical connections between the heating element, thermostat and terminals, and heat-insulating material of predetermined value between the support and the thermostat whereby a lag of predetermined value is established in the transmission of heat from the receptacle to the thermostat.

8. A device for thermal control which comprises a receptacle, an electric heating element associated therewith, circuit terminals, a support of invariable heat-conductivity secured to the receptacle to transmit heat by conduction, a stationary thermostatic unit secured to the support including a heat-insulating housing enclosing the thermostat, and electric connections between the heating element, thermostat and terminals, the heat-insulating material of said housing being of predetermined value, whereby a lag of predetermined value is established in the transmission of heat from the receptacle to the thermostat.

9. A device for thermal control which comprises a receptacle, an electric heating element associated therewith, circuit terminals, a support of invariable heat-conductivity secured to the receptacle to transmit heat by conduction, a stationary thermostatic unit secured to the support including a heat-insulating housing enclosing the thermostat, additional heat-insulating material between the support and the housing, and electric connections between the heating element, thermostat and terminals, the insulating material of said housing and the additional heat-insulating material between the support and the thermostat being of predetermined value, whereby a lag of predetermined value is established in the transmission of heat from the receptacle to the thermostat.

HOYT K. FOSTER.